United States Patent
Yamamoto

(10) Patent No.: US 12,001,131 B2
(45) Date of Patent: Jun. 4, 2024

(54) PROJECTION IMAGE DISPLAY DEVICE

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/841,077

(22) Filed: Jun. 15, 2022

(65) Prior Publication Data

US 2023/0008760 A1   Jan. 12, 2023

(30) Foreign Application Priority Data

Jul. 12, 2021   (JP) .............................. 2021-115175
May 13, 2022   (JP) .............................. 2022-079177

(51) Int. Cl.
*G03B 21/20*   (2006.01)
*G02B 27/14*   (2006.01)
*G03B 33/04*   (2006.01)

(52) U.S. Cl.
CPC ....... *G03B 21/2066* (2013.01); *G02B 27/141* (2013.01); *G03B 33/04* (2013.01)

(58) Field of Classification Search
CPC .. G03B 21/2066; G03B 33/04; G03B 21/005; G03B 21/2013; G03B 21/2033; G03B 21/204; G03B 21/2073; G02B 27/141; G02B 27/1026
See application file for complete search history.

(56) References Cited

U.S. PATENT DOCUMENTS

| | | |
|---|---|---|
| 7,148,936 B1 | 12/2006 | Hirota et al. |
| 2003/0098955 A1 | 5/2003 | Okuyama et al. |
| 2016/0309126 A1* | 10/2016 | Takahara ............. H04N 9/3161 |
| 2017/0205696 A1 | 7/2017 | Kikuma et al. |
| 2019/0361333 A1* | 11/2019 | Yamamoto ......... G03B 21/2066 |
| 2022/0100074 A1* | 3/2022 | Yasui ................... G02B 27/283 |

FOREIGN PATENT DOCUMENTS

| | | |
|---|---|---|
| JP | 2003-75769 | 3/2003 |
| JP | 2003-84364 | 3/2003 |
| JP | 2003-161916 | 6/2003 |
| JP | 2003-255271 | 9/2003 |
| JP | 2005-43705 | 2/2005 |
| JP | 2017-125947 | 7/2017 |

* cited by examiner

*Primary Examiner* — Magda Cruz
(74) *Attorney, Agent, or Firm* — WENDEROTH, LIND & PONACK, L.L.P.

(57) ABSTRACT

A projection image display device of the present disclosure includes a light source, an image forming element that forms an image, a color separating and combining unit that separates first illumination light and second illumination light, and combines first projection light and second projection light reflected by the image forming element, and a notch filter that is disposed between the light source and the color separating and combining unit. A first dichroic filter reflects the first illumination light and the first projection light. A first incident angle of the first illumination light with respect to the first dichroic filter is different from a second incident angle of the first projection light with respect to the first dichroic filter. The notch filter attenuates light in a first wavelength band including a boundary between a wavelength band of the first illumination light and a wavelength band of the second illumination light.

17 Claims, 10 Drawing Sheets

PROJECTION IMAGE DISPLAY DEVICE

BACKGROUND

1. Technical Field

The present disclosure relates to a projection image display device.

2. Description of the Related Art

A projection image display device that separates illumination light into three colors of red, green, and blue, combines the separated light, and displays the separated light on a projection target has been known.

For example, a projection image display device described in Japanese Patent Application Laid-Open No. 2003-161916 decomposes illumination light from an illumination optical system into a plurality of color light rays having different wavelength regions, combines the color light rays reflected by a reflective image display element, and projects and displays color image light.

SUMMARY

The projection image display device described in Japanese Patent Application Laid-Open No. 2003-161916 still has room for improvement in terms of reducing heat generation due to stray light.

The present disclosure can provide a projection image display device capable of reducing heat generation due to stray light.

A projection image display device according to one aspect of the present disclosure includes a light source that illuminates light, an image forming element that includes a first image forming element that forms a first image, and a second image forming element that forms a second image, a color separating and combining unit that includes a first dichroic filter that separates the light from the light source into first illumination light and second illumination light having a wavelength band different from a wavelength band of the first illumination light, the color separating and combining unit emitting the first light illumination to the first image forming element, emitting the second illumination light to the second image forming element, and combining first projection light reflected by the first image forming element and second projection light reflected, and a notch filter that is disposed between the light source and the color separating and combining unit.

The first dichroic filter reflects the first illumination light and the first projection light.

A first incident angle of the first illumination light with respect to the first dichroic filter is different from a second incident angle of the first projection light with respect to the first dichroic filter.

The notch filter attenuates light in a first wavelength band including a boundary between the wavelength band of the first illumination light and the wavelength band of the second illumination light.

According to the present disclosure, it is possible to provide the projection image display device capable of reducing the heat generation due to the stray light.

Figure 1:
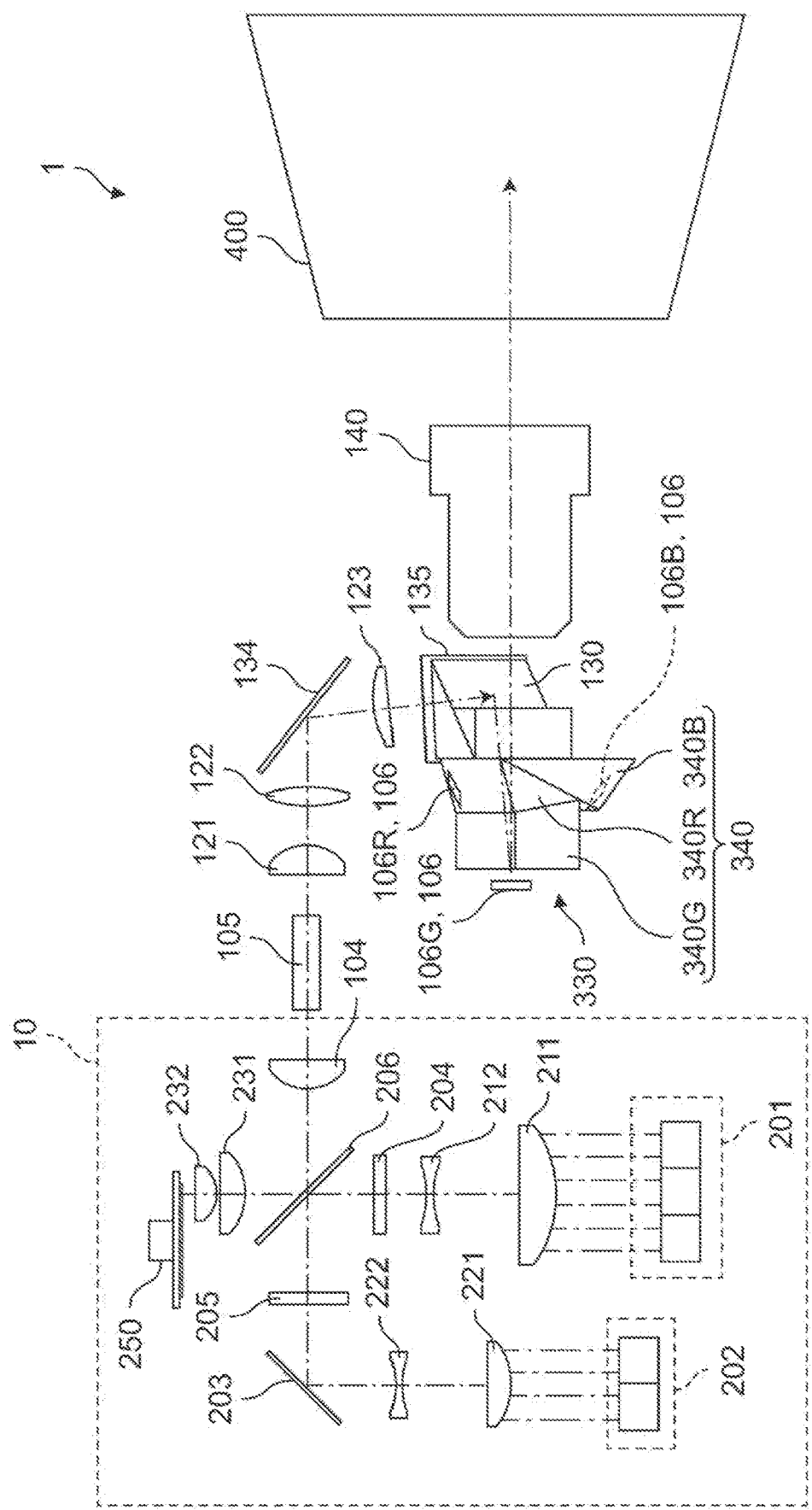
FIG. 1 is a schematic diagram illustrating an overall configuration of a projection image display device according to a first exemplary embodiment.

DETAILED DESCRIPTION (Background to the Present Disclosure)

Conventionally, a projection image display device that separates illumination light from a light source into three colors of red, green, and blue, combines the separated three color light rays, and projects the combined light onto a projection target such as a screen has been developed.

In such a projection image display device, light is separated into three colors of red, green, and blue by using a dichroic filter disposed in a color separating and combining prism, is transmitted through or is transmitted through and reflected by different block-shaped prisms in the color separating and combining prism, and is guided to image forming elements for red, green, and blue provided for the prisms. In each image forming element, a direction in which the light of each color is reflected is selected, and light to be projected onto a screen and unnecessary light are separated. The light to be projected passes through the color separating and combining prism again, and the colors of red, green, and blue are combined again by the dichroic filter. The combined light forms an image on the screen via a projection optical system.

The dichroic filter has incident angle dependency, and when an incident angle of light with respect to the dichroic filter increases, a transmission curve of the dichroic filter shifts to a short wavelength side. In the projection image display device, an incident angle of the illumination light from the light source with respect to the dichroic filter is generally different from an incident angle of projection light reflected by the image forming element with respect to the dichroic filter. Thus, stray light is generated in the color separating and combining prism due to a deviation in the incident angle between the illumination light and the projection light. The stray light generated in the color separating and combining prism heats a surface of the image forming element and the color separating and combining prism.

In the projection image display device, luminance is further increased in order to improve visibility or to perform projection onto a large screen. When intensity of the illumination light incident on the color separating and combining prism is increased in order to increase the luminance, surface temperatures of the image forming element and the color separating and combining prism increase due to the stray light generated due to the difference in the incident angle. Usually, since a gap between the color separating and combining prism and the image forming element is very narrow, it is difficult to lower the surface temperature of the image forming element raised by the stray light. Thus, the generation of the stray light becomes a constraint on increasing the luminance. The stray light heats the surface of the image forming element and the color separating and combining prism, and thus, the temperature rises. Accordingly, deformation occurs due to thermal expansion of the color separating and combining prism. Due to the deformation of the color separating and combining prism, an optical path inside the color separating and combining prism deviates from a desired optical path. When the light is projected onto the screen from the projection optical system, a phenomenon (convergence deviation) in which red, green, and blue light to be originally formed as an image at one point on the screen forms an image occurs. There is a problem that the quality of the projected image is greatly degraded due to the occurrence of the convergence deviation.

Therefore, the inventors of the present disclosure have studied the projection image display device capable of reducing the heat generation caused by the stray light, and have reached the following disclosure.

Hereinafter, exemplary embodiments will be described in detail with appropriate reference to the drawings. It is noted that a more detailed description than necessary may be omitted. For example, the detailed description of already well-known matters and the overlap description of substantially same configurations may be omitted. This is to avoid an unnecessarily redundant description below and to facilitate understanding of a person skilled in the art.

Note that, the accompanying drawings and the following description are provided for those skilled in the art to fully understand the present disclosure, and are not intended to limit the subject matter described in the scope of claims.

First Exemplary Embodiment

[1-1. Configuration]

Projection image display device 1 according to a first exemplary embodiment will be described with reference to FIG. 1. FIG. 1 is a schematic diagram illustrating an overall configuration of projection image display device 1 according to the first exemplary embodiment.

As illustrated in FIG. 1, projection image display device 1 includes light source 10, image forming element 106, color separating and combining unit 330, and notch filter 135, and projects an image onto screen (projection target) 400. In projection image display device 1, light from light source 10 is incident on color separating and combining unit 330, is reflected by image forming element 106, is emitted from projection lens unit 140 via color separating and combining unit 330, and is projected onto screen 400.

Light source 10 illuminates visible light toward color separating and combining unit 330. The visible light from light source 10 has continuous spectral characteristics.

In light source 10, light is emitted from two semiconductor lasers 201 and 202. For example, semiconductor lasers 201 and 202 emit blue light with a wavelength of 456 nm as a center. A polarization state of the light emitted from semiconductor lasers 201 and 202 is aligned to be P-polarization.

The blue light emitted from semiconductor laser 201 is transmitted through convex lens 211 and concave lens 212, and passes through diffuser plate 204. Convex lens 211 and concave lens 212 are focal lenses that re-collimate the light emitted from semiconductor laser 201. The blue light emitted from semiconductor laser 201 passes through convex lens 211 and concave lens 212, is formed into collimated light having a desired light beam width, passes through diffuser plate 204, and reaches dichroic mirror 206.

Dichroic mirror 206 has characteristics of transmitting P-polarized blue light. Thus, the P-polarized blue light emitted from semiconductor laser 201 is transmitted through dichroic mirror 206, is transmitted through condenser lenses 231 and 232, and is substantially formed as an image on phosphor wheel 250 while being gradually concentrated.

Phosphor wheel 250 is formed by, for example, providing a phosphor layer on a surface of a circular aluminum substrate. A rotation motor is disposed in a central portion of the aluminum substrate, and phosphor wheel 250 can be rotated. For example, the phosphor layer is excited by blue light, and is formed by applying a YAG phosphor that emits yellow light containing green and red wavelength components. The light substantially formed as the image by the phosphor layer of phosphor wheel 250 is reflected as yellow light. By the rotation of phosphor wheel 250, a temperature rise of the phosphor layer due to the blue excitation light can be suppressed, and fluorescence conversion efficiency can be stably maintained. The yellow light is continuously emitted from phosphor wheel 250.

The yellow light reflected by phosphor wheel 250 is transmitted through condenser lenses 231 and 232, is reflected by dichroic mirror 206, is transmitted through condenser lens 104, and is incident on rod integrator 105.

On the other hand, the blue light emitted from semiconductor laser 202 is transmitted through convex lens 221 and concave lens 222, and reaches reflection mirror 203. Convex lens 221 and concave lens 222 are focal lenses that re-collimate the light emitted from semiconductor laser 202. The blue light emitted from semiconductor laser 202 passes through convex lens 221 and concave lens 222, is formed into collimated light having a desired light beam width, is reflected by reflection mirror 203, passes through diffuser plate 205, and reaches dichroic mirror 206.

P-polarized light emitted from semiconductor laser 202 passes through dichroic mirror 206, is combined with yellow light reflected by dichroic mirror 206, is transmitted through condenser lens 104, and is incident on rod integrator 105.

In this manner, the yellow light including the green and red wavelength components emitted from phosphor wheel 250 and the blue light from semiconductor laser 202 are combined by dichroic mirror 206.

Rod integrator 105 is made of a transparent member such as glass. The rod integrator reflects incident light inside thereof a plurality of times, and thus, light having a uniform intensity distribution is generated. Rod integrator 105 may be a solid rod, or may be a hollow rod whose inner wall is formed by a mirror surface.

Lenses 121, 122, and 123 are relay optical systems that substantially form an image of the light emitted from rod integrator 105 on image forming element 106. The light emitted from rod integrator 105 is transmitted through lenses 121, 122, and 123, is reflected by reflection mirror 134, is transmitted through notch filter 135, and is incident on color separating and combining unit 330. Notch filter 135 attenuates light in a predetermined wavelength band of the light transmitted through lenses 121 to 123. Details of notch filter 135 will be described later.

Figure 2:
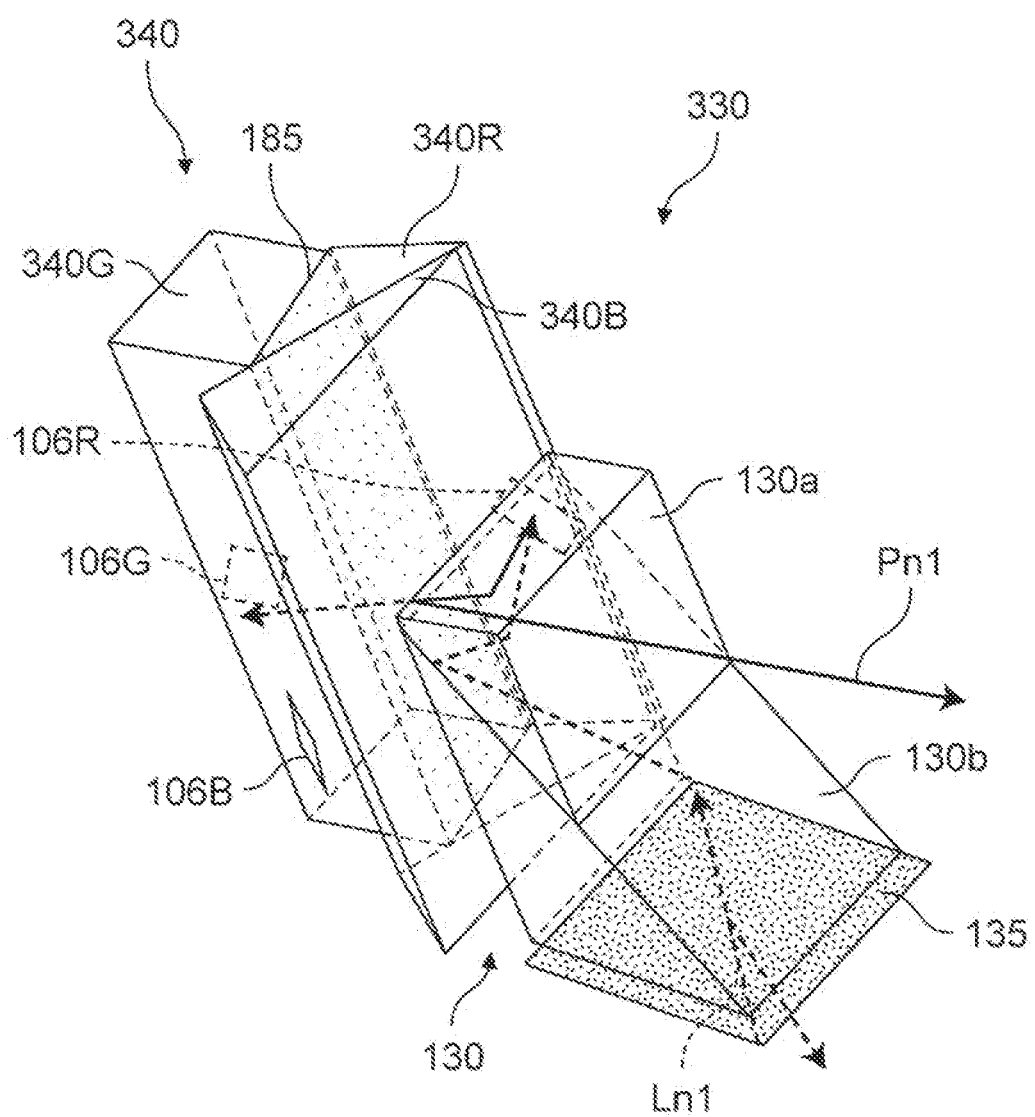
FIG. 2 is a schematic diagram illustrating a path of light in a red wavelength band separated by a color separating and combining unit of the projection image display device of FIG. 1.
Figure 3:
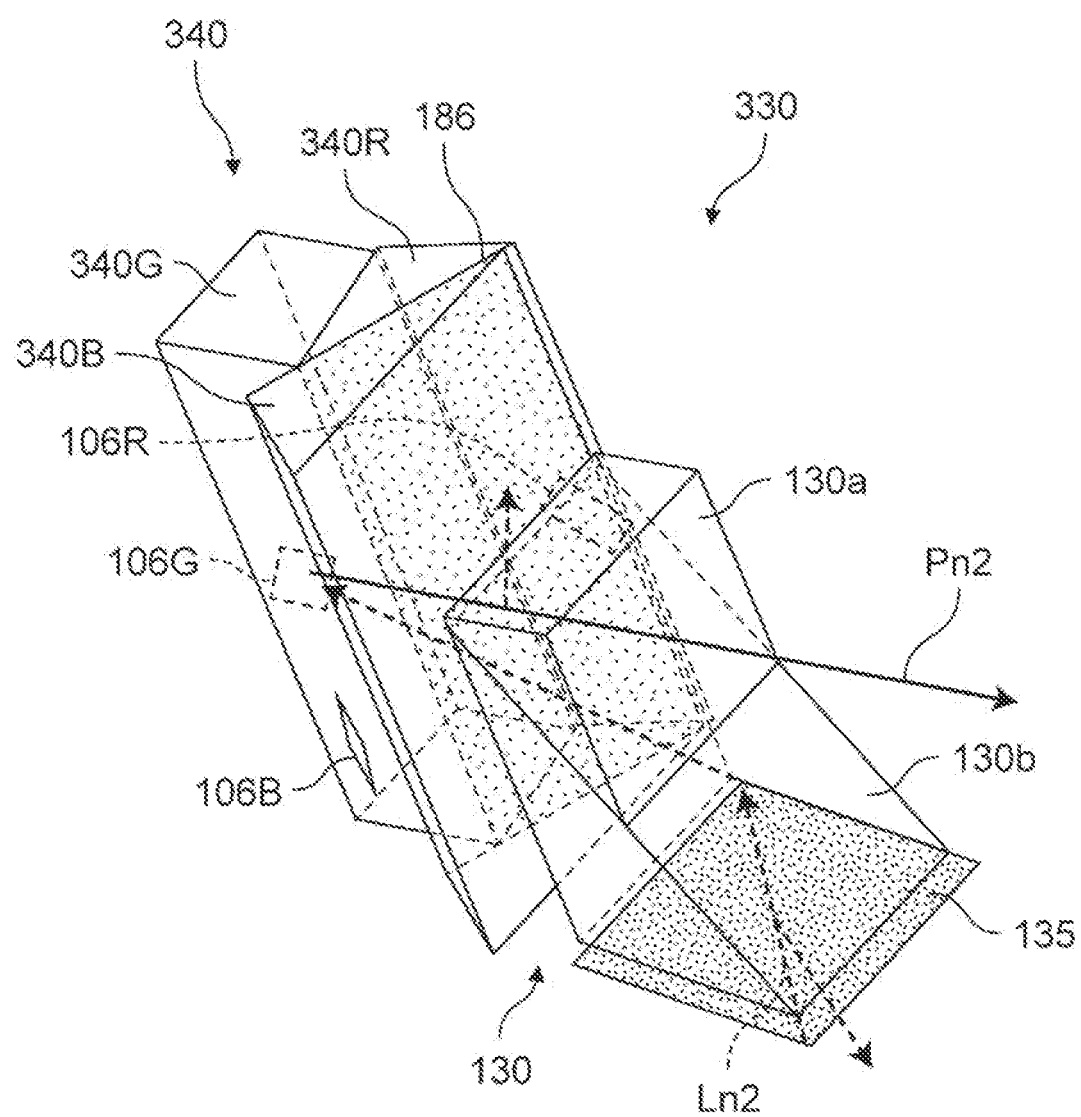
FIG. 3 is a schematic diagram illustrating a path of light in a green wavelength band separated by a color separating and combining unit of the projection image display device of FIG. 1.

FIG. 2 is a schematic diagram illustrating a path of light in a red wavelength band separated by color separating and combining unit 330 of projection image display device 1 in FIG. 1. FIG. 3 is a schematic diagram illustrating a path of light in a green wavelength band separated by color separating and combining unit 330 of projection image display device 1 in FIG. 1. Note that, blue reflection dichroic filter 186 is not illustrated in FIG. 2, and red reflection dichroic filter 185 is not illustrated in FIG. 3.

As illustrated in FIG. 2 and FIG. 3, color separating and combining unit 330 includes total reflection prism 130 and color separating and combining prism 340. Total reflection prism 130 includes, for example, two prisms 130a and 130b having a substantially triangular prism shape. Total reflection prism 130 totally internally reflects illumination light from light source 10 and emits the illumination light toward image forming element 106. Notch filter 135 is disposed on a surface of prism 130b on which the illumination light from light source 10 is incident.

Color separating and combining unit 330 separates light from the light source into red illumination light (first illumination light), green illumination light (second illumination light), and blue illumination light (third illumination light) having different wavelength bands by the red reflection dichroic filter and the blue reflection dichroic filter. Color separating and combining unit 330 emits the red illumination light to image forming element 106R (first image forming element), emits the green illumination light to image forming element 106G (second image forming element), and emits the blue illumination light to image forming element 106B (third image forming element). Color separating and combining unit 330 combines red projection light (first projection light) reflected by image forming element 106R, green projection light (second projection light) reflected by image forming element 106G, and blue projection light (third projection light) reflected by image forming element 106B.

A wavelength band of the red light (first illumination light and first projection light) is, for example, greater than or equal to 600 nm and less than or equal to 730 nm. A wavelength band of the green light (second illumination light and second projection light) is, for example, greater than or equal to 515 nm and less than or equal to 599 nm. A wavelength band of the blue light (third illumination light and third projection light) is, for example, greater than or equal to 420 nm and less than or equal to 514 nm.

Figure 6A:
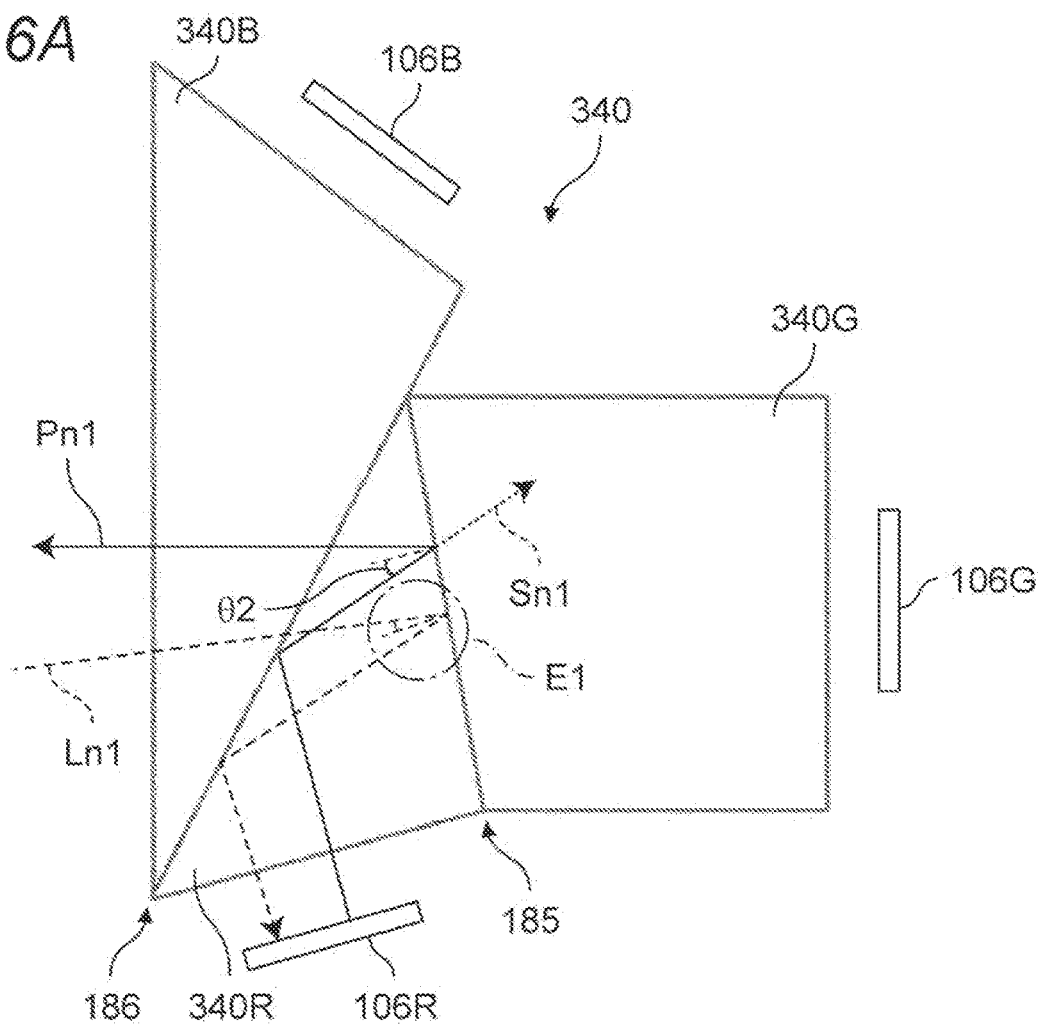
FIG. 6A is a diagram illustrating optical paths of first illumination light and first projection light in the color separating and combining prism.

Color separating and combining prism 340 includes three prisms 340G, 340R, and 340B. As illustrated in FIG. 6A, prism 340G faces image forming element 106G, prism 340R faces image forming element 106R, and prism 340B faces image forming element 106B. Color separating and combining prism 340 further includes red reflection dichroic filter 185 and blue reflection dichroic filter 186. Red reflection dichroic filter 185 (first dichroic filter, see FIG. 2) is formed on a proximity surface between prism 340G and prism 340R. Blue reflection dichroic filter 186 (second dichroic filter, see FIG. 3) is formed between prism 340R and prism 340B. That is, as illustrated in FIG. 6A, red reflection dichroic filter 185 is disposed between prism 340R and prism 340G, and blue reflection dichroic filter 186 is disposed between prism 340R and prism 340B. Prism 340R and prism 340B are substantially triangular prisms, and prism 340G is a substantially quadrangular prism.

The light incident on color separating and combining prism 340 is separated into light in wavelength bands of red, green, and blue, and an image is substantially formed by image forming element 106 corresponding to each color.

In the present exemplary embodiment, image forming element 106 includes three image forming elements of image forming element 106R (first image forming element), image forming element 106G (second image forming element), and image forming element 106B (third image forming element). In the present exemplary embodiment, image forming element 106 includes a digital micromirror device (DMD) including a plurality of movable micromirrors. Each micromirror of image forming element 106 basically corresponds to one pixel. Image forming element 106 switches whether or not to direct the light reflected by image forming element 106 to projection lens unit 140 by changing an angle of each micromirror based on various control signals. In this manner, each image forming element forms an image.

Of the light reflected by image forming element 106, light (DMD-ON light) to be projected as an image is incident on projection lens unit 140 and is then emitted to screen 400. Of the light reflected by image forming element 106, light that is not projected as an image (DMD-OFF light) is not incident on projection lens unit 140 but is output from color separating and combining prism 340.

Here, the path of the light in the red wavelength band will be described with reference to FIG. 2. Note that, in the following description, the light in the red wavelength band from light source 10 toward image forming element 106R is referred to as first illumination light Ln1, and the light (DMD-ON light) reflected by image forming element 106R and projected as an image is referred to as first projection light Pn1.

Of the light incident on color separating and combining prism 340 from total reflection prism 130, first illumination light Ln1 in the red wavelength band is transmitted through blue reflection dichroic filter 186 (see FIG. 3) via prism 340B and is then incident on prism 340R. First illumination light Ln1 incident on prism 340R from prism 340B passes through prism 340R and reaches red reflection dichroic filter 185. First illumination light Ln1 reaching red reflection dichroic filter 185 is reflected by red reflection dichroic filter 185.

First illumination light Ln1 in the red wavelength band reflected by red reflection dichroic filter 185 is totally reflected on a surface of prism 340R by a gap provided between prism 340R and prism 340B, and substantially forms an image on image forming element 106R.

First projection light Pn1 reflected by image forming element 106R is incident on prism 340R again, is totally reflected by the surface of prism 340R, and is then incident on red reflection dichroic filter 185 again. First projection light Pn1 substantially reflected by red reflection dichroic filter 185 passes through prism 340B and total reflection prism 130, is incident on projection lens unit 140, and is then projected onto screen 400.

Next, the path of the light in the green wavelength band will be described with reference to FIG. 3. Note that, in the following description, the light in the green wavelength band from the light source toward image forming element 106G is referred to as second illumination light Ln2, and the light (DMD-ON light) reflected by image forming element 106G and projected as an image is referred to as second projection light Pn2.

Of the light incident on color separating and combining prism 340 from total reflection prism 130, second illumination light Ln2 in the green wavelength band is transmitted through blue reflection dichroic filter 186 via prism 340B and is then incident on prism 340R. Second illumination light Ln2 incident on prism 340R from prism 340B passes through prism 340R and reaches red reflection dichroic filter 185 (see FIG. 2). Second illumination light Ln2 reaching red reflection dichroic filter 185 is transmitted through red reflection dichroic filter 185 and is incident on prism 340G. Second illumination light Ln2 passes through prism 340G and substantially forms an image on image forming element 106G.

Second projection light Pn2 reflected by image forming element 106G is incident on prism 340G again, is substantially transmitted through red reflection dichroic filter 185 (see FIG. 2), and is incident on prism 340R. After passing through prism 340R, second projection light Pn2 is incident on blue reflection dichroic filter 186 again. Second projection light Pn2 is substantially transmitted through blue reflection dichroic filter 186, passes through prism 340B and total reflection prism 130, is incident on projection lens unit 140, and is then projected onto screen 400.

On the other hand, of the light incident on color separating and combining prism 340 from total reflection prism 130, third illumination light in the blue wavelength band is incident on prism 340B, is reflected by blue reflection dichroic filter 186, is totally reflected on a surface of prism 340B, and is then substantially formed as an image on image forming element 106B.

The third projection light reflected by image forming element 106B is incident on prism 340B again, is totally reflected by the surface of prism 340B, and is then incident on blue reflection dichroic filter 186 again. The third projection light substantially reflected by blue reflection dichroic filter 186 passes through prism 340B and total reflection prism 130, is incident on projection lens unit 140, and is then projected onto screen 400.

Figure 4:
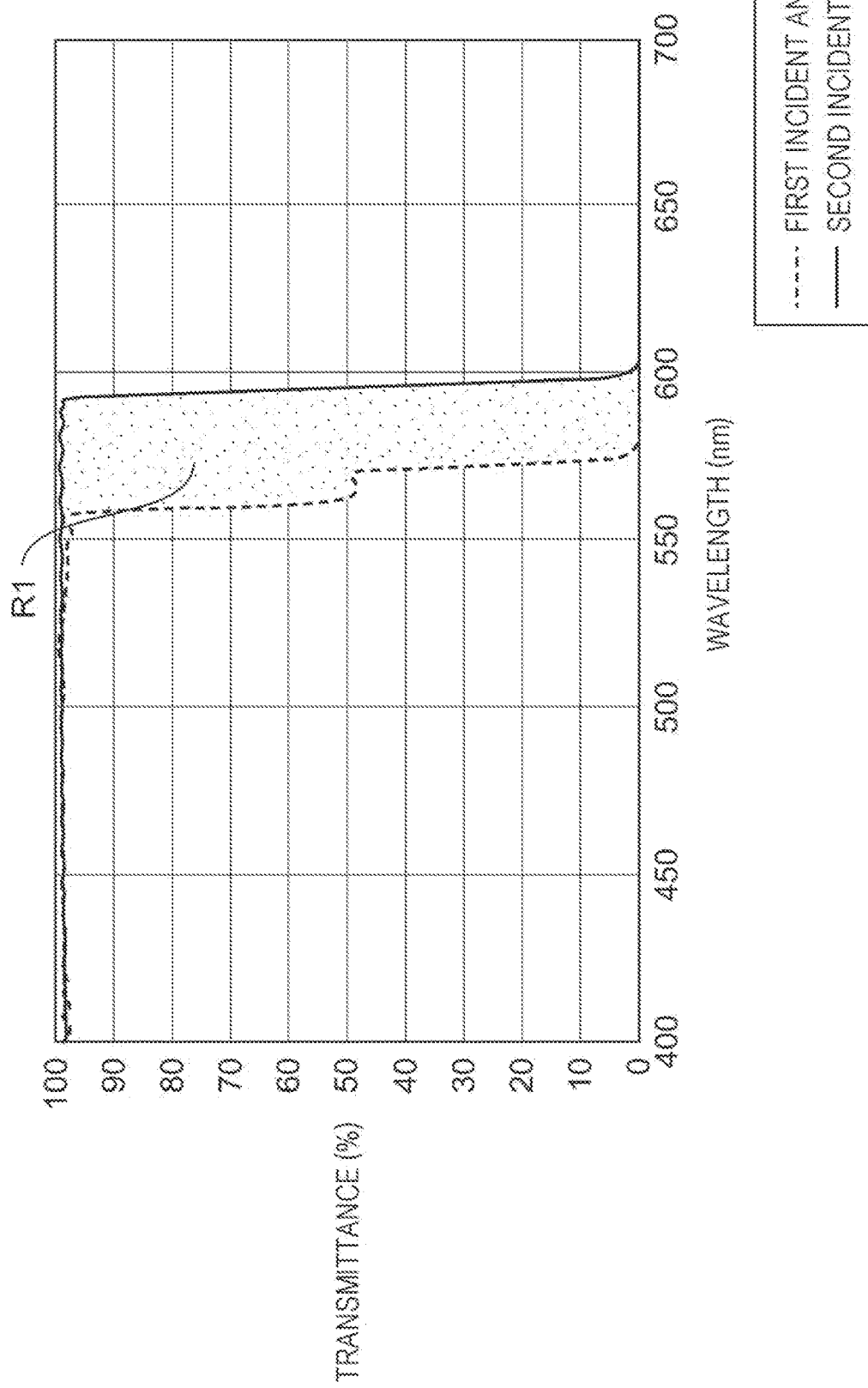
FIG. 4 is a diagram illustrating spectral transmittance characteristics of a red reflection dichroic filter.
Figure 5:
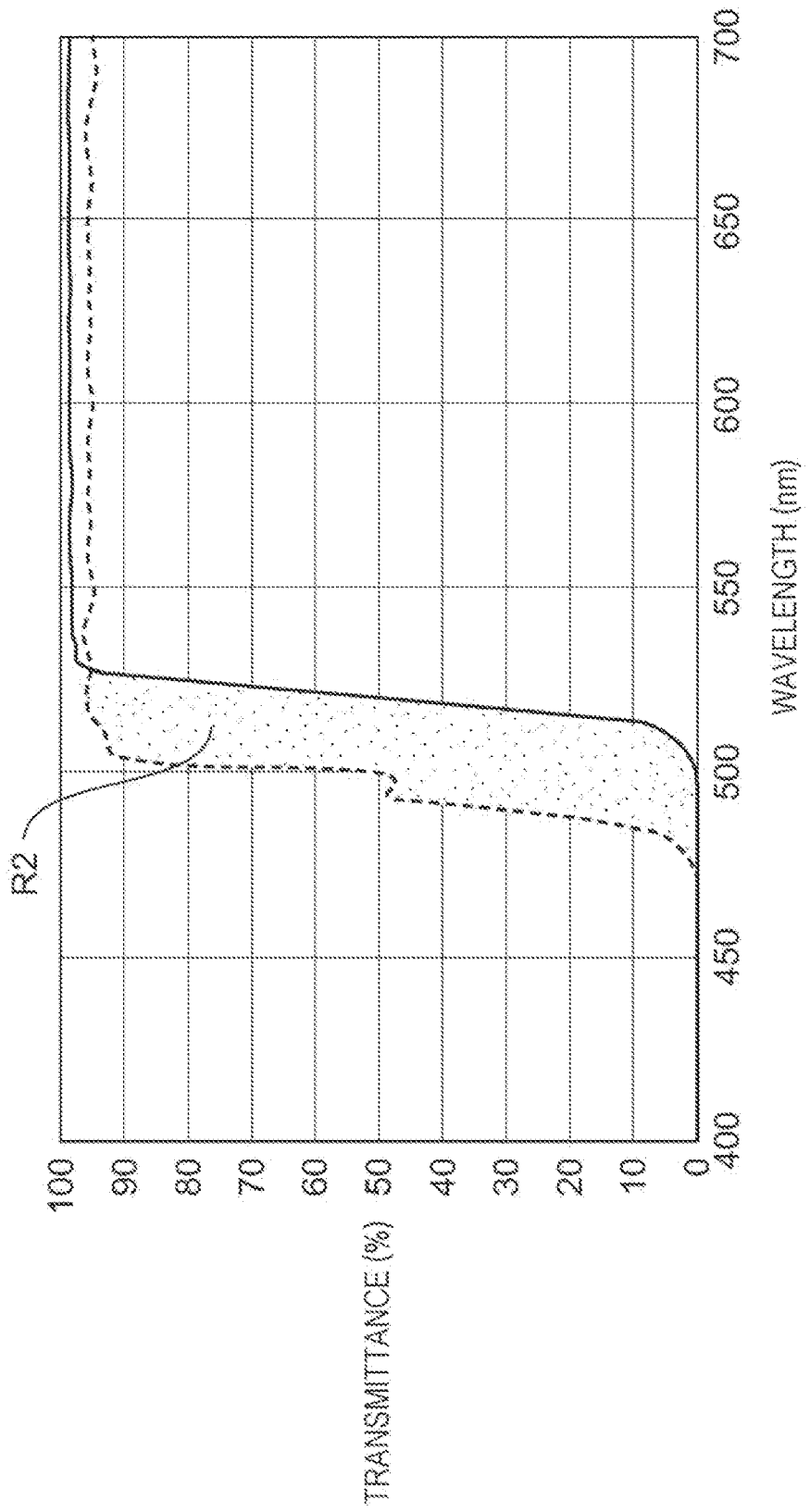
FIG. 5 is a diagram illustrating spectral transmittance characteristics of a blue reflection dichroic filter.
Figure 6B:
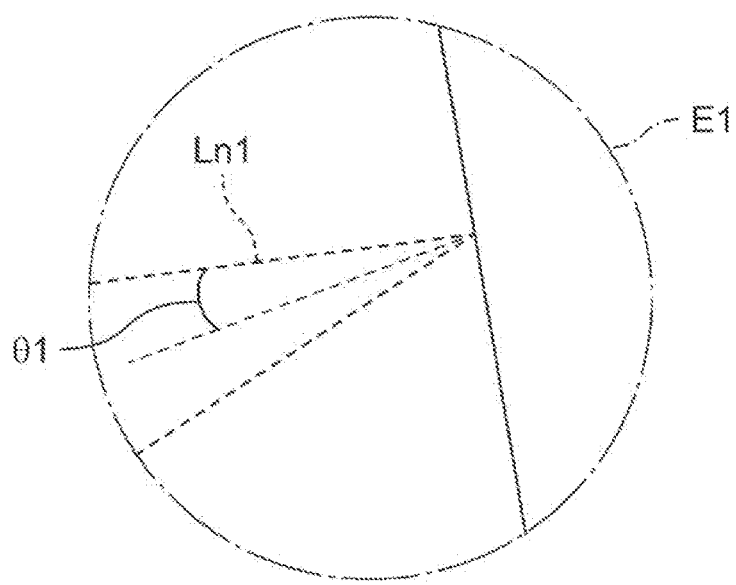
FIG. 6B is an enlarged view of region E1 of FIG. 6A.
Figure 7:
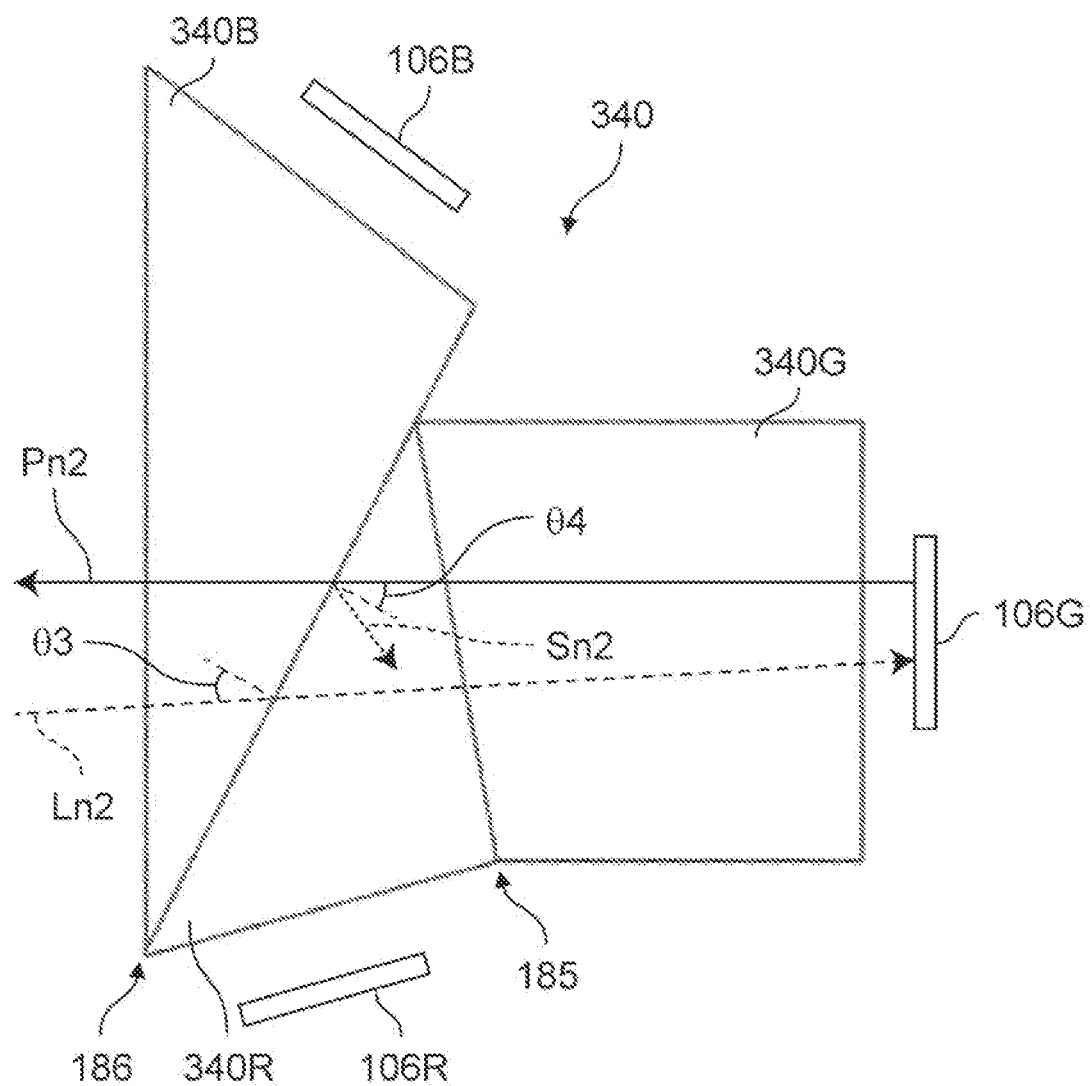
FIG. 7 is a diagram illustrating optical paths of second illumination light and second projection light in the color separating and combining prism.

FIG. 4 is a diagram illustrating spectral transmittance characteristics of red reflection dichroic filter 185. FIG. 5 is a diagram illustrating spectral transmittance characteristics of blue reflection dichroic filter 186. FIG. 6A is a diagram illustrating optical paths of first illumination light Ln1 and first projection light Pn1 in color separating and combining prism 340. FIG. 6B is an enlarged view of region E1 of FIG. 6A. FIG. 7 is a diagram illustrating optical paths of second illumination light Ln2 and second projection light Pn2 in color separating and combining prism 340.

In FIG. 4, a broken line indicates a spectral transmittance characteristic of first illumination light Ln1 at first incident angle θ1 with respect to red reflection dichroic filter 185, and a solid line indicates a spectral transmittance characteristic of first projection light Pn1 at second incident angle θ2 with respect to red reflection dichroic filter 185. In FIG. 5, a broken line indicates a spectral transmittance characteristic of second illumination light Ln2 at third incident angle θ3 with respect to blue reflection dichroic filter 186, and a solid line indicates a spectral transmittance characteristic of second projection light Pn2 at fourth incident angle θ4 with respect to blue reflection dichroic filter 186.

Red reflection dichroic filter 185 reflects the light in the red wavelength band and transmits light in a wavelength band other than red. That is, red reflection dichroic filter 185 reflects first illumination light Ln1 and first projection light Pn1.

As illustrated in FIG. 6A and FIG. 6B, first illumination light Ln1 in the red wavelength band is incident on red reflection dichroic filter 185 at first incident angle θ1, is reflected, and is directed to image forming element 106R. First projection light Pn1 in the red wavelength band reflected by image forming element 106R is incident on red reflection dichroic filter 185 at second incident angle θ2.

First incident angle θ1 of first illumination light Ln1 with respect to red reflection dichroic filter 185 is different from second incident angle θ2 of first projection light Pn1 with respect to red reflection dichroic filter 185. In the present exemplary embodiment, second incident angle θ2 is smaller than first incident angle θ1, that is, first projection light Pn1 is incident on red reflection dichroic filter 185 at an angle smaller than first illumination light Ln1.

Red reflection dichroic filter 185 has a property that a spectral transmittance characteristic changes depending on an incident angle. Thus, as illustrated in FIG. 4, in red reflection dichroic filter 185, a phenomenon in which a component of a wavelength band reflected in first illumination light Ln1 is transmitted in first projection light Pn1 occurs. This phenomenon is referred to as dichroic shift. In the present exemplary embodiment, region R1 in FIG. 4 is a wavelength band that is reflected in first illumination light Ln1 and is transmitted in first projection light Pn1. Region R1 is a wavelength band including a boundary between the red wavelength band and the green wavelength band, and mainly includes light of an amber color component.

When first illumination light Ln1 is incident on red reflection dichroic filter 185, the light in region R1 is reflected and is directed to image forming element 106R. When first projection light Pn1 reflected by image forming element 106R is incident on the red reflection dichroic filter again, the light in region R1 is transmitted and becomes stray light Sn1 inside color separating and combining prism 340. Stray light Sn1 heats image forming element 106 or other components of color separating and combining unit 330. Thus, a temperature rise occurs in image forming element 106 or the components of color separating and combining unit 330, or a convergence deviation occurs in the image projected onto screen 400.

Blue reflection dichroic filter 186 reflects the light in the blue wavelength band and transmits light in a wavelength band other than blue. That is, blue reflection dichroic filter 186 reflects the third illumination light and the third projection light.

Here, as illustrated in FIG. 7, second illumination light Ln2 in the green wavelength band is incident on and is transmitted through blue reflection dichroic filter 186 at third incident angle θ3, and is directed to image forming element 106G. Second projection light Pn2 in the green wavelength band reflected by image forming element 106G is incident on blue reflection dichroic filter 186 at fourth incident angle θ4.

Third incident angle θ3 of second illumination light Ln2 with respect to blue reflection dichroic filter 186 is different from fourth incident angle θ4 of second projection light Pn2 with respect to blue reflection dichroic filter 186. In the present exemplary embodiment, fourth incident angle θ4 is smaller than third incident angle θ3, that is, second projection light Pn2 is incident on blue reflection dichroic filter 186 at an angle smaller than second illumination light Ln2.

Blue reflection dichroic filter 186 also has a property that a spectral transmittance characteristic changes depending on an incident angle. Thus, as illustrated in FIG. 5, in blue reflection dichroic filter 186, a phenomenon in which a component of a wavelength band transmitted in second illumination light Ln2 is reflected in second projection light Pn2 occurs. That is, the dichroic shift also occurs in blue reflection dichroic filter 186. In the present exemplary embodiment, region R2 in FIG. 5 is a wavelength band that is transmitted in second illumination light Ln2 and is reflected in second projection light Pn2. Region R2 is a wavelength band including a boundary between the green wavelength band and the blue wavelength band, and mainly includes light of a cyan color component.

When second illumination light Ln2 is incident on blue reflection dichroic filter 186, the light in region R2 is transmitted and is directed to image forming element 106G. When second projection light Pn2 reflected by image forming element 106G is incident on the blue reflection dichroic filter again, the light in region R2 is reflected and becomes stray light Sn2 inside color separating and combining prism 340. Stray light Sn2 heats image forming element 106 or other components of color separating and combining unit 330. Thus, a temperature rise occurs in image forming element 106 or the components of color separating and combining unit 330, or a convergence deviation occurs in the image projected onto screen 400.

In the present exemplary embodiment, notch filter 135 is disposed between light source 10 and color separating and combining unit 330. More specifically, notch filter 135 is disposed between lens 123 of the relay optical system and total reflection prism 130. Notch filter 135 is disposed, and thus, it is possible to reduce the stray light by attenuating light in at least a part of wavelength bands of regions R1 and R2 illustrated in FIG. 4 and FIG. 5.

Notch filter 135 is a band stop filter that attenuates light of a specific wavelength. More specifically, notch filter 135 reflects at least a part of the light in regions R1 and R2 of the light from light source 10. The light reflected by notch filter 135 is absorbed by the relay optical system or the like of light source 10, and thus, the light is not incident on color separating and combining unit 330.

In the present exemplary embodiment, notch filter 135 is disposed on an incident surface of the light from light source 10 to color separating and combining unit 330. More specifically, the notch filter is disposed on a surface of total reflection prism 130 on which the light from light source 10 is incident. Notch filter 135 is disposed perpendicular to an optical axis from light source 10.

For example, a notch filter in which a filter that attenuates an amber color component and a filter that attenuates a cyan color component are formed on front and back surfaces of a plate-shaped optical member can be used as notch filter 135. That is, notch filter 135 may include a notch filter that attenuates the amber color component and a notch filter that attenuates the cyan color component.

Figure 8:
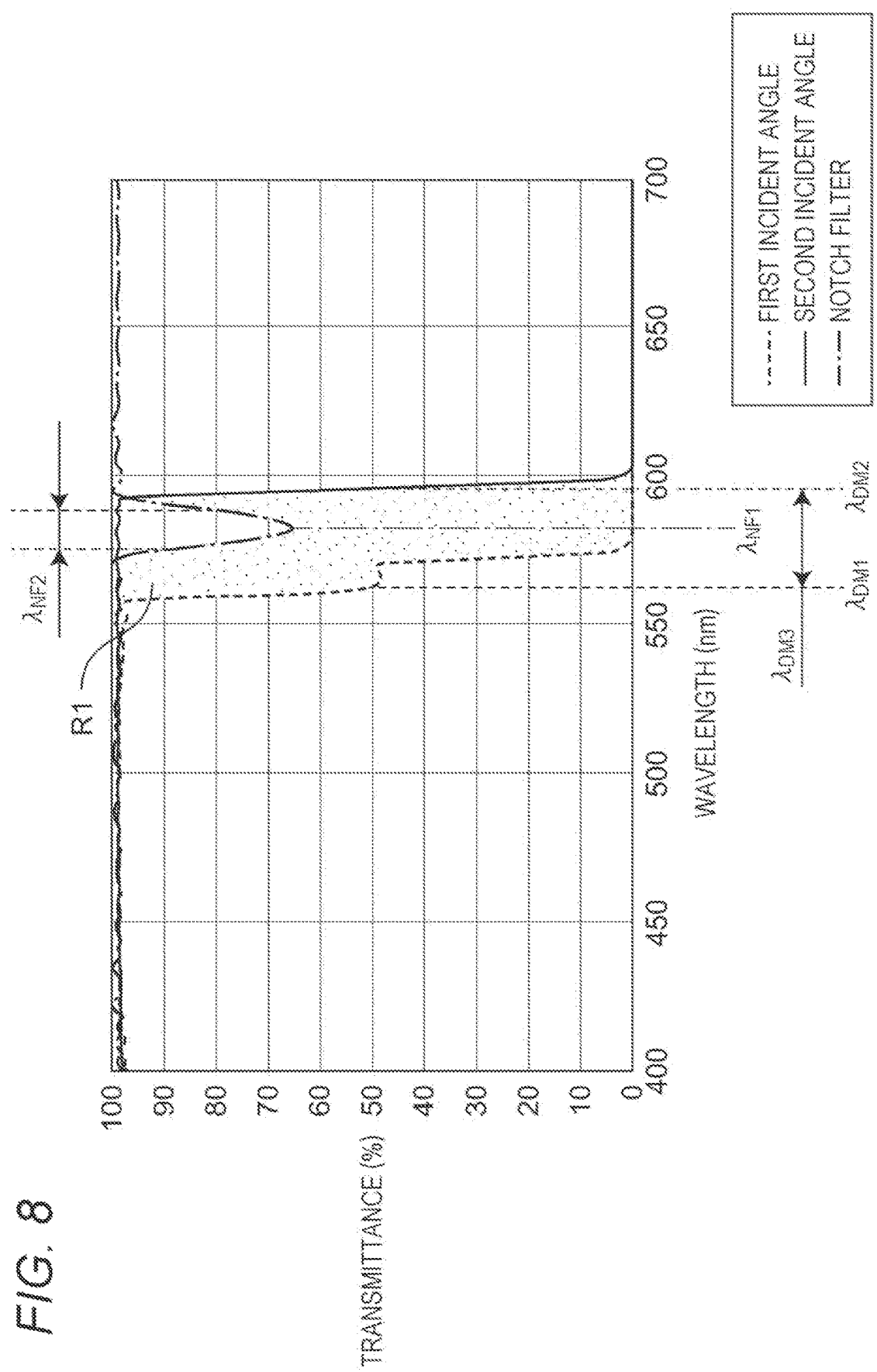
FIG. 8 is a diagram illustrating spectral transmittance characteristics of a notch filter corresponding to a red reflection dichroic filter.
Figure 9:
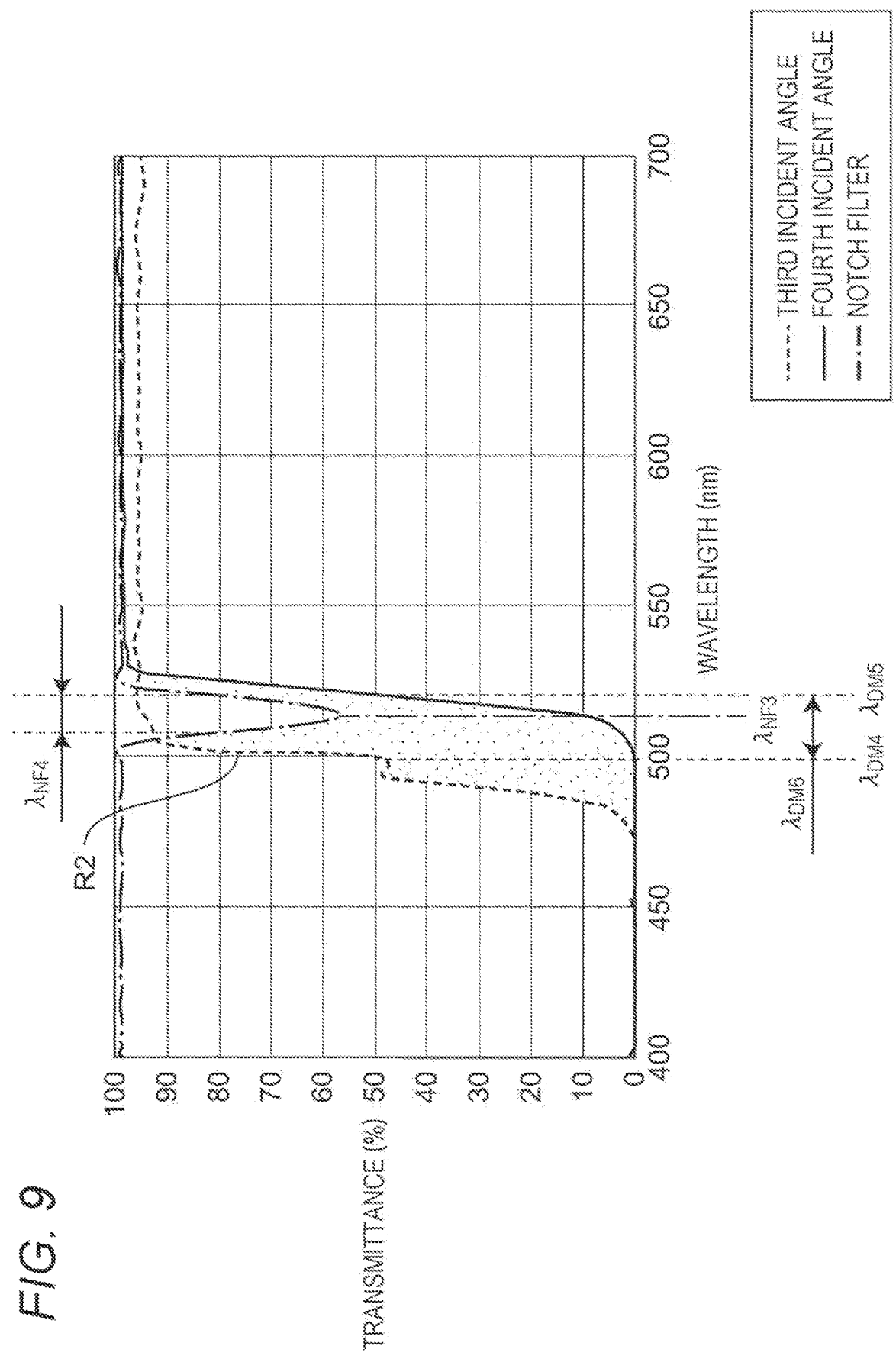
FIG. 9 is a diagram illustrating spectral transmittance characteristics of a notch filter corresponding to a blue reflection dichroic filter.

FIG. 8 is a diagram illustrating spectral transmittance characteristics of notch filter 135 corresponding to red reflection dichroic filter 185. FIG. 9 is a diagram illustrating spectral transmittance characteristics of notch filter 135 corresponding to blue reflection dichroic filter 186. Notch filter 135 will be described with reference to FIG. 8 and FIG. 9.

In FIG. 8, a broken line indicates a first incident angle of first illumination light Ln1 with respect to red reflection dichroic filter 185, a solid line indicates a second incident angle of first projection light Pn1 with respect to red reflection dichroic filter 185, and a dashed dotted line indicates a spectral transmittance characteristic of the notch filter. In FIG. 9, a broken line indicates a third incident angle of second illumination light Ln2 with respect to blue reflection dichroic filter 186, a solid line indicates a fourth incident angle of second projection light Pn2 with respect to blue reflection dichroic filter 186, and a dashed dotted line indicates spectral transmittance characteristics of the notch filter.

As illustrated in FIG. 8, at least a part of the light included in region R1 of red reflection dichroic filter 185 of the light from light source 10 is attenuated by notch filter 135 before being incident on color separating and combining unit 330. That is, at least a part of light that may become stray light of the light from light source 10 is reflected by notch filter 135. A wavelength band including a boundary between the wavelength band (red wavelength band) of first illumination light Ln1 and the wavelength band (green wavelength band) of second illumination light Ln2 attenuated by notch filter 135 corresponds to a first wavelength band of the present disclosure. The light in the first wavelength band mainly includes an amber color component.

Similarly, as illustrated in FIG. 9, at least a part of the light included in region R2 of blue reflection dichroic filter 186 of the light from light source 10 is attenuated by notch filter 135 before being incident on color separating and combining unit 330. That is, at least a part of light that may become stray light of the light from light source 10 is reflected by notch filter 135. A wavelength band including a boundary between the wavelength band (green wavelength band) of second illumination light Ln2 attenuated by notch filter 135 and the wavelength band (blue wavelength band) of the third illumination light corresponds to a second wavelength band of the present disclosure. The light in the second wavelength band mainly includes a cyan component.

As illustrated in FIG. 8 and FIG. 9, in the present exemplary embodiment, a minimum transmittance of the wavelength attenuated by notch filter 135 is about 55% to 65%. When the minimum transmittance of the wavelength attenuated by the notch filter is less than or equal to 80%, the stray light can be sufficiently reduced. More specifically, as illustrated in FIG. 8, the notch filter (first notch filter) that attenuates the amber color component of notch filter 135 attenuates light of center wavelength ($\lambda_{NF1}$) of the first wavelength band by 20% or more. In one example, the first notch filter may attenuate the light of center wavelength ($\lambda_{NF1}$) of the first wavelength band by 30% or more. A full width at half maximum of the first notch filter may be, for example, less than or equal to 25 nm. In one example, the full width at half maximum of the first notch filter may be less than or equal to 20 nm or 15 nm. As illustrated in FIG. 9, the notch filter (second notch filter) that attenuates the cyan component of notch filter 135 attenuates light having center wavelength ($\lambda_{NF3}$) of the second wavelength band by 20% or more. In one example, the second notch filter may attenuate the light of center wavelength ($\lambda_{NF3}$) of the second wavelength band by 30% or more or 40% or more. A full width at half maximum of the second notch filter may be, for example, less than or equal to 25 nm. In one example, the full width at half maximum of the second notch filter may be less than or equal to 20 nm or 15 nm.

Characteristics of notch filter 135 corresponding to red reflection dichroic filter 185 satisfy Expressions (1) and (2). Specifically, when $\lambda_{DM1}$ is smaller than $\lambda_{DM2}$, the characteristics of notch filter 135 satisfy Expression (1) and an upper stage of Expression (2), and when $\lambda_{DM1}$ is larger than $\lambda_{DM2}$, the characteristics of notch filter 135 satisfy Expression (1) and a lower stage of (2).

[Math. 1]
$$\lambda_{DM3} > \lambda_{NF2} \quad (1)$$

[Math. 2]
$$\lambda_{DM1} + \frac{\lambda_{DM3}}{4} \leq \lambda_{NF1} \leq \lambda_{DM2} - \frac{\lambda_{DM3}}{4} \quad (\lambda_{DM1} < \lambda_{DM2}) \quad (2)$$
$$\lambda_{DM2} + \frac{\lambda_{DM3}}{4} \leq \lambda_{NF1} \leq \lambda_{DM1} - \frac{\lambda_{DM3}}{4} \quad (\lambda_{DM1} > \lambda_{DM2})$$

Here, $\lambda_{DM1}$ is a wavelength at which a transmittance of the light incident on red reflection dichroic filter 185 at first incident angle θ1 becomes 50%. $\lambda_{DM2}$ is a wavelength at which a transmittance of the light incident on red reflection dichroic filter 185 at second incident angle θ2 becomes 50%. $\lambda_{DM3}$ is a wavelength width between $\lambda_{DM1}$ and $\lambda_{DM2}$. $\lambda_{NF1}$ is a center wavelength of the first wavelength band of notch filter 135. $\lambda_{NF2}$ is a full width at half maximum (FWHM) of the first wavelength band. In the example of FIG. 8, $\lambda_{NF1}$=582 nm, $\lambda_{NF2}$=13 nm, $\lambda_{DM1}$=562 nm, $\lambda_{DM2}$=596 nm, and $\lambda_{DM3}$=34 nm.

Similarly, the characteristics of notch filter 135 corresponding to blue reflection dichroic filter 186 satisfy Expressions (3) and (4). Specifically, when $\lambda_{DM4}$ is smaller than $\lambda_{DM5}$, the characteristics of notch filter 135 satisfy Expression (3) and an upper stage of Expression (4), and when $\lambda_{DM4}$ is larger than $\lambda_{DM5}$, the characteristics of notch filter 135 satisfy Expression (3) and a lower stage of Expression (4).

[Math. 3]
$$\lambda_{DM6} > \lambda_{NF4} \quad (3)$$

[Math. 4]
$$\lambda_{DM4} + \frac{\lambda_{DM6}}{4} \leq \lambda_{NF3} \leq \lambda_{DM5} - \frac{\lambda_{DM6}}{4} \quad (\lambda_{DM4} < \lambda_{DM5}) \quad (4)$$
$$\lambda_{DM5} + \frac{\lambda_{DM6}}{4} \leq \lambda_{NF3} \leq \lambda_{DM4} - \frac{\lambda_{DM6}}{4} \quad (\lambda_{DM4} > \lambda_{DM5})$$

Here, $\lambda_{DM4}$ is a wavelength at which a transmittance of the light incident on blue reflection dichroic filter 186 at third incident angle θ3 becomes 50%. $\lambda_{DM5}$ is a wavelength at which a transmittance of the light incident on blue reflection dichroic filter 186 at fourth incident angle θ4 becomes 50%. $\lambda_{DM6}$ is a wavelength width between $\lambda_{DM4}$ and $\lambda_{DM5}$. $\lambda_{NF3}$ is a center wavelength of the second wavelength band of notch filter 135. $\lambda_{NF4}$ is a full width at half maximum (FWHM) of the second wavelength band. In the example of FIG. 9, $\lambda_{NF3}$=513 nm, $\lambda_{NF4}$=13 nm, $\lambda_{DM4}$=497 nm, $\lambda_{DM5}$=520 nm, and $\lambda_{DM6}$=23 nm.

Figure 10:
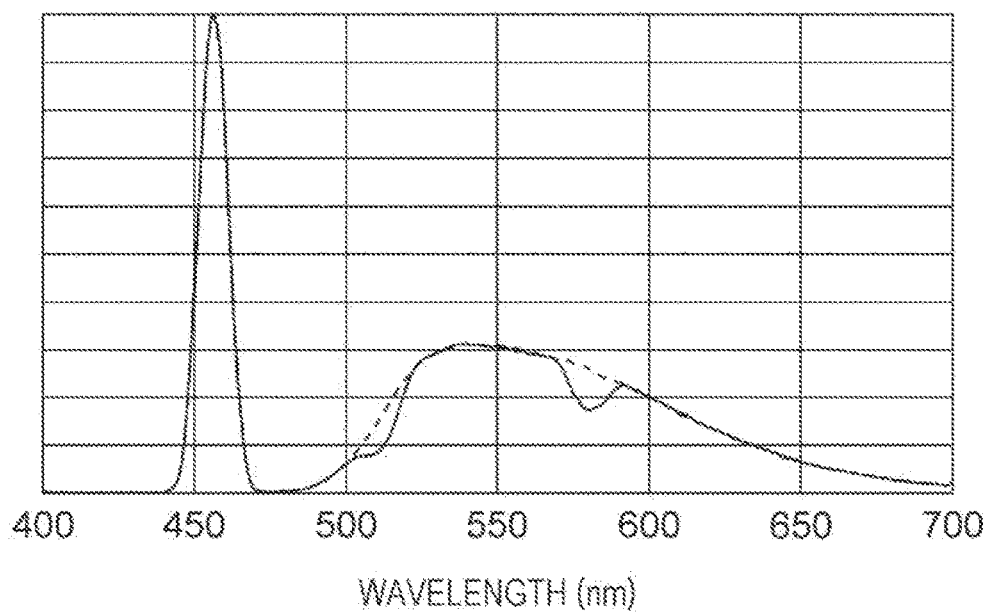
FIG. 10 is a diagram illustrating a wavelength distribution of illumination light incident on the color separating and combining unit.
Figure 11:
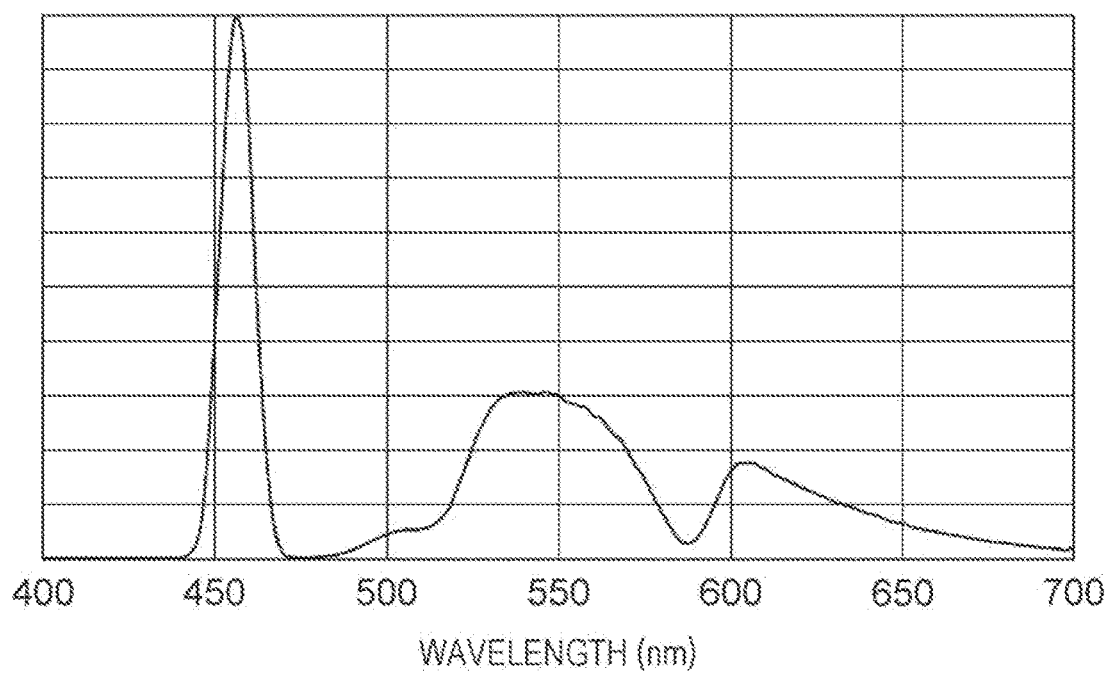
FIG. 11 is a diagram illustrating a wavelength distribution of projection light emitted from the color separating and combining unit.

FIG. 10 is a diagram illustrating a wavelength distribution of the illumination light incident on color separating and combining unit 330. FIG. 11 is a view illustrating a wavelength distribution of the projection light emitted from color separating and combining unit 330. In FIG. 10, a solid line indicates a wavelength distribution when notch filter 135 is disposed, and a broken line indicates a wavelength distribution when notch filter 135 is not disposed.

As illustrated in FIG. 10, when notch filter 135 is disposed, the light in the first wavelength band and the second wavelength band of the illumination light incident on color separating and combining unit 330 are attenuated. As illustrated in FIG. 11, the light including the first wavelength band and the second wavelength band is lost due to the dichroic shifts in red reflection dichroic filter 185 and blue reflection dichroic filter 186. Notch filter 135 is disposed, and thus, light in a wavelength band of a defective portion in the projection light can be attenuated before being incident on color separating and combining unit 330. Thus, the wavelength distribution and the light amount of the projection light do not change regardless of the presence or absence of the arrangement of notch filter 135.

When notch filter 135 is disposed as described above, since the stray light in color separating and combining unit 330 can be reduced, the heat generation of image forming element 106 or color separating and combining unit 330 can be suppressed. When notch filter 135 is disposed, the stray light can be reduced by about 30% as compared with a case where notch filter 135 is not disposed.

[1-2. Advantageous Effects and the Like]

According to the above-described exemplary embodiment, it is possible to reduce the stray light generated by a difference in the incident angle (dichroic shift) to the dichroic filter. As a result, the heat generation of image forming element 106 and color separating and combining unit 330 can be suppressed.

In order to improve the efficiency of the projection image display device, a tilt angle of image forming element (DMD) 106 tends to increase. However, when the tilt angle of image forming element (DMD) 106 increases, since the dichroic shift also increases, thus, the stray light tends to increase. In the present exemplary embodiment, notch filter 135 attenuates the light in the wavelength band to become the stray light in color separating and combining unit 330 and image forming element 106 in advance, and thus, the stray light can be reduced.

The stray light is reduced, and thus, the heat generation in image forming element 106 and color separating and combining unit 330 can be reduced. The occurrence of the convergence deviation and the like can be suppressed.

Other Exemplary Embodiments

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. In addition, a new exemplary embodiment can be made by combining the components described in the above exemplary embodiments.

In the above-described exemplary embodiment, although the example in which color separating and combining unit 330 separates light from the light source into light in three wavelength bands of the first illumination light, the second illumination light, and the third illumination light and synthesizes the light has been described, the present invention is not limited thereto. For example, the third image forming element is not an essential component, and the image forming element may include the first image forming element and the second image forming element. In this case, the notch filter may attenuate the light in the first wavelength band including the boundary between the wavelength band of the first illumination light and the wavelength band of the second illumination light. For example, the display of the green (first illumination light) and the display of the red and blue (second illumination light) are controlled in a time-division manner at high speed by using two image forming elements. Thus, the image projected onto screen 400 can be perceived as a full-color image.

In the above-described exemplary embodiment, although the example in which notch filter 135 is disposed in total reflection prism 130 of color separating and combining unit 330 has been described, the arrangement of notch filter 135 is not limited thereto. Notch filter 135 may be disposed between light source 10 and color separating and combining unit 330, and for example, notch filter 135 may be disposed on any surface of lenses 121 to 123 of the relay optical system.

In the above-described exemplary embodiment, although the example in which the notch filter in which the filter that attenuates the amber color component and the filter that attenuates the cyan color component are formed on the front and back surfaces of the plate-shaped optical member is used notch filter 135 has been described, the present invention is not limited thereto. For example, a notch filter in which a filter that attenuates both the amber color component and the cyan color component is formed on one surface of the plate-shaped optical member is used as the notch filter. Alternatively, the notch filter may include both the filter that attenuates the amber color component and the filter that attenuates the cyan color component. Alternatively, the notch filter may not use the plate optical member, and may include both the filter that attenuates the amber color component and the filter that attenuates the cyan color component on a surface of total reflection prism 130 on lens 123 side of the relay optical system.

In the above-described exemplary embodiment, although the example in which image forming element 106 is the DMD has been described, the present invention is not limited thereto. Image forming element 106 may be, for example, a reflective image display element such as LCOS.

As described above, the exemplary embodiment has been described to exemplify the techniques in the present disclosure. For that purpose, the accompanying drawings and the detailed description have been provided. Therefore, in order to illustrate the above techniques, the components described in the accompanying drawings and the detailed description can include not only components essential to solve a problem but also components not essential to solve a problem. Accordingly, when those non-essential components are described in the accompanying drawings and detailed description, the non-essential components should not be immediately acknowledged to be essential based on only the description.

Further, since the above-described exemplary embodiments are for exemplifying the techniques in the present disclosure, various changes, replacements, additions, omissions, and the like can be made within the scope of the appended claims or the scope equivalent thereto.

Outline of Exemplary Embodiments (1) A projection image display device of the present disclosure includes a light source that illuminates light, an image forming element that includes a first image forming element and a second image forming element that form images, a color separating and combining unit that separates the light from the light source into first illumination light and second illumination light having different wavelength bands by a first dichroic filter, and combines first projection light reflected by the first image forming element and second projection light reflected by the second image forming element by emitting the first light illumination to the first image forming element and emitting the second illumination light to the second image forming element, and a notch filter that is disposed between the light source and the color separating and combining unit. The first dichroic filter reflects the first illumination light and the first projection light, a first incident angle of the first illumination light with respect to the first dichroic filter and a second incident angle of the first projection light with respect to the first dichroic filter are different, and the notch filter attenuates light in a first wavelength band including a boundary between the wavelength band of the first illumination light and the wavelength band of the second illumination light.

With such a configuration, it is possible to provide the projection image display device capable of reducing the heat generation due to the stray light.

(2) In the projection image display device of (1), the notch filter satisfies $\lambda_{DM3} > \lambda_{NF2}$, and $\lambda_{DM1} + \lambda_{DM3}/4 \leq \lambda_{DM2} \leq \lambda_{DM3} - \lambda_{DM3}/4$ (when $\lambda_{DM1} < \lambda_{DM2}$) or $\lambda_{DM2} + \lambda_{DM3}/4 \leq \lambda_{NF1} \leq \lambda_{DM1} - \lambda_{DM3}/4$ (when $\lambda_{DM1} > \lambda_{DM2}$), $\lambda_{DM1}$ is a wavelength at which a transmittance of the first dichroic filter with respect to light incident on the first dichroic filter at the first incident angle is 50%, $\lambda_{DM2}$ is a wavelength at which a transmittance of the first dichroic filter with respect to light incident on the first dichroic filter at the second incident angle is 50%, $\lambda_{DM3}$ is a wavelength width between $\lambda_{DM1}$ and $\lambda_{DM2}$, $\lambda_{NF1}$ is a center wavelength of the first wavelength band of the notch filter, and $\lambda_{NF2}$ is a full width at half maximum (FWHM) of the first wavelength band of the notch filter.

With such a configuration, the notch filter can efficiently attenuate light in the wavelength band that becomes stray light in the color separating and combining unit.

(3) In the projection image display device of (1) or (2), the image forming element further includes a third image forming element that forms an image, the color separating and combining unit further includes a second dichroic filter, the first dichroic filter and the second dichroic filter separate the light from the light source into the first illumination light, the second illumination light, and third illumination light having different wavelength bands, and combines the first projection light reflected by the first image forming element, the second projection light reflected by the second image forming element, and third projection light reflected by the third image forming element by emitting the first illumination light to the first image forming element, emitting the second illumination light to the second image forming element, and emitting the third illumination light to the third image forming element. The second dichroic filter reflects the third illumination light and the third projection light. A third incident angle of the second illumination light with respect to the second dichroic filter and a fourth incident angle of the second projection light with respect to the second dichroic filter are different. The notch filter attenuates at least one of the light in the first wavelength band and light in a second wavelength band including a boundary between the wavelength band of the second illumination light and the wavelength band of the third illumination light.

With such a configuration, even when the color separating and combining unit separates and combines the light from the light source into three colors, the stray light can be reduced, and thus, the heat generation can be reduced.

(4) In the projection image display device of (3), the notch filter satisfies $\lambda_{DM6} > \lambda_{NF4}$ and $\lambda_{DM4} + \lambda_{DM6}/4 \leq \lambda_{NF3} \leq \lambda_{DM5} - \lambda_{DM6}/4$ (when $\lambda_{DM4} < \lambda_{DM5}$) and $\lambda_{DM5} + \lambda_{DM6}/4 \leq \lambda_{NF3} \leq \lambda_{DM4} - \lambda_{DM6}/4$ (when $\lambda_{DM4} > \lambda_{DM5}$), $\lambda_{DM4}$ is a wavelength at which a transmittance of the second dichroic filter with respect to light incident on the second dichroic filter at the third incident angle is 50%, $\lambda_{DM5}$ is a wavelength at which a transmittance of the second dichroic filter with respect to light incident on the second dichroic filter at the fourth incident angle is 50%, $\lambda_{DM6}$ is a wavelength width between $\lambda_{DM4}$ and $\lambda_{DM5}$, $\lambda_{NF3}$ is a center wavelength of the second wavelength band of the notch filter, and $\lambda_{NF4}$ is a full width at half maximum (FWHM) of the second wavelength band of the notch filter.

With such a configuration, the notch filter can efficiently attenuate light in the wavelength band that becomes stray light in the color separating and combining unit.

(5) In the projection image display device according to any one of (1) to (4), the notch filter is disposed on an incident surface of the light from the light source on the color separating and combining unit.

With such a configuration, the light in the wavelength band that can be the stray light in the color separating and combining unit can be efficiently attenuated.

(6) In the projection image display device according to any one of (1) to (5), the image forming element includes a digital micromirror device (DMD).

With such a configuration, it is possible to provide a small projection image display device that prevents the stray light from entering the imaging element.

(7) In the projection image display device according to any one of (1) to (6), the light source illuminates visible light, and the visible light has continuous spectral characteristics.

With such a configuration, it is possible to project a high-quality image.

The present disclosure is applicable to a projection image display device that projects an image.

What is claimed is:

1. A projection image display device, comprising:
a light source that illuminates light;
a light intensity distribution uniformizing unit that is disposed at a position where the light emitted from the light source is incident;
an image forming element that includes a first image forming element that forms a first image, and a second image forming element that forms a second image;
a color separating and combining unit that includes a first dichroic filter that separates the light from the light source into first illumination light and second illumination light having a wavelength band different from a wavelength band of the first illumination light, the color separating and combining unit emitting the first illumination light to the first image forming element, emitting the second illumination light to the second image forming element, and combining first projection light reflected by the first image forming element and second projection light reflected by the second image forming element; and
a notch filter that is disposed between the light intensity distribution uniformizing unit and the color separating and combining unit, wherein
the first dichroic filter reflects the first illumination light and the first projection light,
a first incident angle of the first illumination light with respect to the first dichroic filter is different from a second incident angle of the first projection light with respect to the first dichroic filter, and
the notch filter attenuates light in a first wavelength band including a boundary between the wavelength band of the first illumination light and the wavelength band of the second illumination light.

2. The projection image display device according to claim 1, wherein
the wavelength band of the first illumination light is a red wavelength band, and
the wavelength band of the second illumination light is a green wavelength band.

3. The projection image display device according to claim 2, wherein
the color separating and combining unit further includes a first prism that faces the first image forming element, and
a second prism that faces the second image forming element, wherein the first dichroic filter is disposed between the first prism and the second prism.

4. The projection image display device according to claim 1, wherein
when $\lambda_{DM1}$ is smaller than $\lambda_{DM2}$, the notch filter satisfies $\lambda_{DM3} > \lambda_{NF2}$ and $\lambda_{DM1} + \lambda_{DM3}/4 \leq \lambda_{NF1} \leq \lambda_{DM2} - \lambda_{DM3}/4$,
when $\lambda_{DM1}$ is larger than $\lambda_{DM2}$, the notch filter satisfies $\lambda_{DM3} > \lambda_{NF2}$ and $\lambda_{DM2} + \lambda_{DM3}/4 \leq \lambda_{NF1} \leq \lambda_{DM1} - \lambda_{DM3}/4$,
$\lambda_{DM1}$ is a wavelength at which a transmittance of the first dichroic filter with respect to light incident on the first dichroic filter at the first incident angle is 50%,
$\lambda_{DM2}$ is a wavelength at which a transmittance of the first dichroic filter with respect to light incident on the first dichroic filter at the second incident angle is 50%,
$\lambda_{DM3}$ is a wavelength width between $\lambda_{DM1}$ and $\lambda_{DM2}$,
$\lambda_{NF1}$ is a center wavelength of the first wavelength band of the notch filter, and
$\lambda_{NF2}$ is a full width at half maximum (FWHM) of the first wavelength band of the notch filter.

5. The projection image display device according to claim 4, wherein the notch filter attenuates light of the center wavelength of the first wavelength band by 20% or more.

6. The projection image display device according to claim 1, wherein
the image forming element further includes a third image forming element that forms a third image,
the color separating and combining unit further includes a second dichroic filter,
the first dichroic filter and the second dichroic filter separate the light from the light source into the first illumination light, the second illumination light, and third illumination light having a wavelength band different from the wavelength band of the first illumination light and the wavelength band of the second illumination light,
the color separating and combining unit emits the first illumination light to the first image forming element, emits the second illumination light to the second image forming element, emits the third illumination light to the third image forming element, and combines the first projection light reflected by the first image forming element, the second projection light reflected by the second image forming element, and third projection light reflected by the third image forming element,
the second dichroic filter reflects the third illumination light and the third projection light,
a third incident angle of the second illumination light with respect to the second dichroic filter is different from a fourth incident angle of the second projection light with respect to the second dichroic filter, and
the notch filter attenuates at least one of the light in the first wavelength band and light in a second wavelength band including a boundary between the wavelength band of the second illumination light and the wavelength band of the third illumination light.

7. The projection image display device according to claim 6, wherein
the wavelength band of the first illumination light is a red wavelength band, the wavelength band of the second illumination light is a green wavelength band, and
the wavelength band of the third illumination light is a blue wavelength band.

8. The projection image display device according to claim 7, wherein
the color separating and combining unit further includes
a first prism that faces the first image forming element,
a second prism that faces the second image forming element, and
a third prism that faces the third image forming element,
the first dichroic filter is disposed between the first prism and the second prism, and
the second dichroic filter is disposed between the first prism and the third prism.

9. The projection image display device according to claim 6, wherein
when $\lambda_{DM4}$ is smaller than $\lambda_{DM5}$, the notch filter satisfies $\lambda_{DM6} > \lambda_{NF4}$ and $\lambda_{DM4} + \lambda_{DM6}/4 \leq \lambda_{NF3} \leq \lambda_{DM5} - \lambda_{DM6}/4$,
when $\lambda_{DM4}$ is larger than $\lambda_{DM5}$, the notch filter satisfies $\lambda_{DM6} > \lambda_{NF4}$ and $\lambda_{DM5} + \lambda_{DM6}/4 \leq \lambda_{NF3} \leq \lambda_{DM4} - \lambda_{DM6}/4$,
$\lambda_{DM4}$ is a wavelength at which a transmittance of the second dichroic filter with respect to light incident on the second dichroic filter at the third incident angle is 50%,
$\lambda_{DM5}$ is a wavelength at which a transmittance of the second dichroic filter with respect to light incident on the second dichroic filter at the fourth incident angle is 50%,
$\lambda_{DM6}$ is a wavelength width between $\lambda_{DM4}$ and $\lambda_{DM5}$,
$\lambda_{NF3}$ is a center wavelength of the second wavelength band of the notch filter, and
$\lambda_{NF4}$ is a full width at half maximum (FWHM) of the second wavelength band of the notch filter.

10. The projection image display device according to claim 9, wherein the notch filter attenuates light of a center wavelength of the first wavelength band by 20% or more, and attenuates light of a center wavelength of the second wavelength band by 20% or more.

11. The projection image display device according to claim 10, wherein
the notch filter includes
a first notch filter that attenuates the light of the center wavelength of the first wavelength band by 20% or more, and
a second notch filter that attenuates the light of the center wavelength of the second wavelength band by 20% or more.

12. The projection image display device according to claim 11, wherein
a full width at half maximum of the first notch filter is less than or equal to 25 nm, and
a full width at half maximum of the second notch filter is less than or equal to 25 nm.

13. The projection image display device according to claim 1, wherein
the color separating and combining unit has an incident surface on which the light from the light source is incident, and
the notch filter is disposed on the incident surface of the color separating and combining unit.

14. The projection image display device according to claim 1, wherein the image forming element is a digital micromirror device (DMD).

15. The projection image display device according to claim 1, wherein
the light source illuminates visible light, and
the visible light has continuous spectral characteristics.

16. The projection image display device according to claim 1, wherein
the light intensity distribution uniformizing unit is a rod integrator.

17. A projection image display device, comprising:
a light source that illuminates light;
an image forming element that includes a first image forming element that forms a first image, and a second image forming element that forms a second image;
a color separating and combining unit that includes a first dichroic filter that separates the light from the light source into first illumination light and second illumination light having a wavelength band different from a wavelength band of the first illumination light, the color separating and combining unit emitting the first illumination light to the first image forming element, emitting the second illumination light to the second image forming element, and combining first projection light reflected by the first image forming element and second projection light reflected by the second image forming element; and
a notch filter that is disposed between the light source and the color separating and combining unit, wherein
the first dichroic filter reflects the first illumination light and the first projection light,
a first incident angle of the first illumination light with respect to the first dichroic filter is different from a second incident angle of the first projection light with respect to the first dichroic filter,
the notch filter attenuates light in a first wavelength band including a boundary between the wavelength band of the first illumination light and the wavelength band of the second illumination light,
when $\lambda_{DM1}$ is smaller than $\lambda_{DM2}$, the notch filter satisfies $\lambda_{DM3} > \lambda_{NF2}$ and $\lambda_{DM1} + \lambda_{DM3}/4 \leq \lambda_{NF1} \leq \lambda_{DM2} - \lambda_{DM3}/4$,
when $\lambda_{DM1}$ is larger than $\lambda_{DM2}$, the notch filter satisfies $\lambda_{DM3} > \lambda_{NF2}$ and $\lambda_{DM2} + \lambda_{DM3}/4 \leq \lambda_{NF1} \leq \lambda_{DM1} - \lambda_{DM3}/4$,
$\lambda_{DM1}$ is a wavelength at which a transmittance of the first dichroic filter with respect to light incident on the first dichroic filter at the first incident angle is 50%,
$\lambda_{DM2}$ is a wavelength at which a transmittance of the first dichroic filter with respect to light incident on the first dichroic filter at the second incident angle is 50%,
$\lambda_{DM3}$ is a wavelength width between $\lambda_{DM1}$ and $\lambda_{DM2}$,
$\lambda_{NF1}$ is a center wavelength of the first wavelength band of the notch filter, and
$\lambda_{NF2}$ is a full width at half maximum (FWHM) of the first wavelength band of the notch filter.

* * * * *